United States Patent
Grosz et al.

(10) Patent No.: US 9,784,552 B2
(45) Date of Patent: *Oct. 10, 2017

(54) CONTROLLABLE CALIPER

(71) Applicant: Oceaneering International, Inc., Houston, TX (US)

(72) Inventors: Gregory C. Grosz, Houston, TX (US); Hans A. Kros, Houston, TX (US)

(73) Assignee: OCEANEERING INTERNATIONAL, INC., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/291,445

(22) Filed: May 30, 2014

(65) Prior Publication Data

US 2014/0259720 A1 Sep. 18, 2014

Related U.S. Application Data

(63) Continuation of application No. 12/243,536, filed on Oct. 1, 2008, now Pat. No. 8,744,801.

(Continued)

(51) Int. Cl.

| G01B 5/02 | (2006.01) |
|---|---|
| G01B 7/02 | (2006.01) |
| G01B 11/02 | (2006.01) |
| G01B 13/02 | (2006.01) |
| G01B 21/02 | (2006.01) |
| G01B 3/38 | (2006.01) |
| G01B 3/00 | (2006.01) |
| G01B 3/02 | (2006.01) |
| G01B 3/20 | (2006.01) |
| G01B 5/08 | (2006.01) |

(52) U.S. Cl.
CPC ............... *G01B 3/38* (2013.01); *G01B 3/002* (2013.01); *G01B 3/02* (2013.01); *G01B 3/205* (2013.01); *G01B 5/08* (2013.01); *G01B 7/02* (2013.01); *G01B 3/20* (2013.01)

(58) Field of Classification Search
CPC . G01B 7/02; G01B 3/20; G01B 3/205; G01B 5/14; G01B 7/14
USPC .......................................................... 702/158
See application file for complete search history.

(56) References Cited

U.S. PATENT DOCUMENTS 3,559,432 A * 2/1971 Rastelli .......................... 72/13.3
4,302,881 A * 12/1981 Schwind et al. ............. 33/544.3

(Continued)

*Primary Examiner* — Michael Nghiem
(74) *Attorney, Agent, or Firm* — Maze IP Law, PC

(57) ABSTRACT

An embodiment of the invention is directed to an electronic caliper which combines positioning and measurement in one unit without the use of hydraulics for subsea use. In certain embodiments, several attachments can be affixed to accommodate a range of measurement tasks. In a preferred embodiment, one jaw is adjustable and the other, or opposing, jaw is fixed to a mounting structure. The jaws typically allow for the removal and replacement of other attachments. In another embodiment, the unit communicates to computer software for position control, precise indication and clamping for adjustment. In a preferred embodiment, computer software displays all feedback via laptop computer on surface. The caliper is maneuvered to a position proximate an object and used to measure a predetermined physical characteristic of the object. The measurement can be displayed using a computer with control software.

20 Claims, 7 Drawing Sheets

Related U.S. Application Data

(60) Provisional application No. 60/977,825, filed on Oct. 5, 2007, provisional application No. 61/032,552, filed on Feb. 29, 2008.

(56) References Cited

U.S. PATENT DOCUMENTS

| | | | |
|---|---|---|---|
| 4,550,506 A * | 11/1985 | Katayama | 33/830 |
| 4,604,808 A * | 8/1986 | Jeannet | G01B 3/20 |
| | | | 33/810 |
| 5,029,402 A * | 7/1991 | Lazecki et al. | 33/784 |
| 5,029,469 A * | 7/1991 | Chase et al. | 73/159 |
| 6,339,886 B1 * | 1/2002 | Reinhardt | 33/544.2 |
| 8,744,801 B2 * | 6/2014 | Grosz et al. | 702/158 |
| 2006/0171091 A1 * | 8/2006 | Seale et al. | 361/160 |
| 2007/0000682 A1 * | 1/2007 | Varkey et al. | 174/102 R |
| 2008/0047158 A1 * | 2/2008 | Saito | G01B 3/205 |
| | | | 33/811 |
| 2008/0177503 A1 * | 7/2008 | Stockman | 702/161 |
| 2008/0184582 A1 * | 8/2008 | Kim | A61B 19/46 |
| | | | 33/784 |
| 2012/0203070 A1 * | 8/2012 | Crenshaw | A61B 5/0051 |
| | | | 600/202 |

* cited by examiner

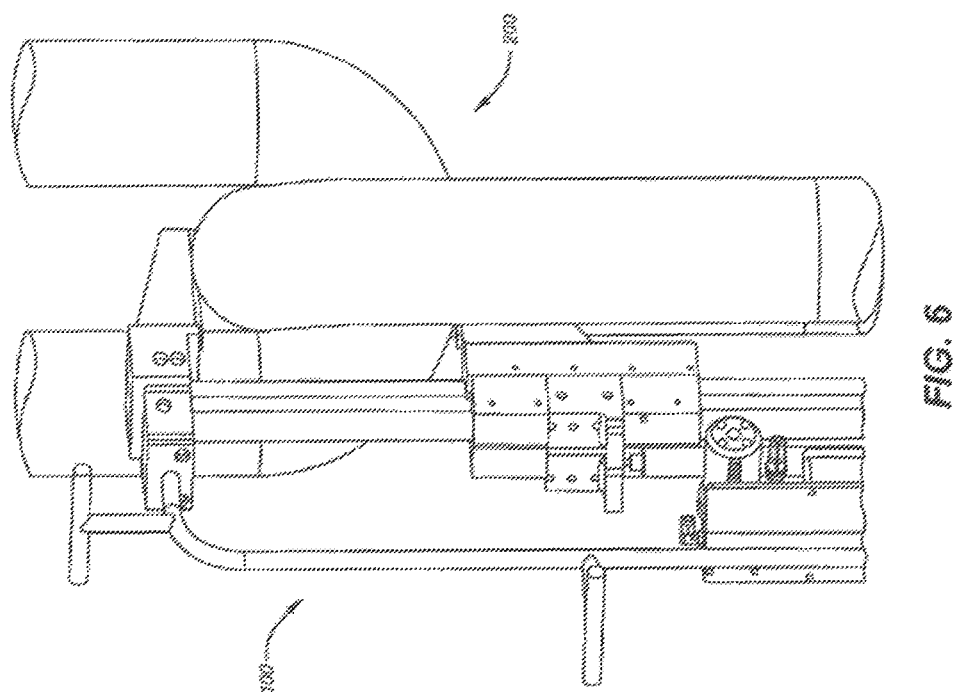

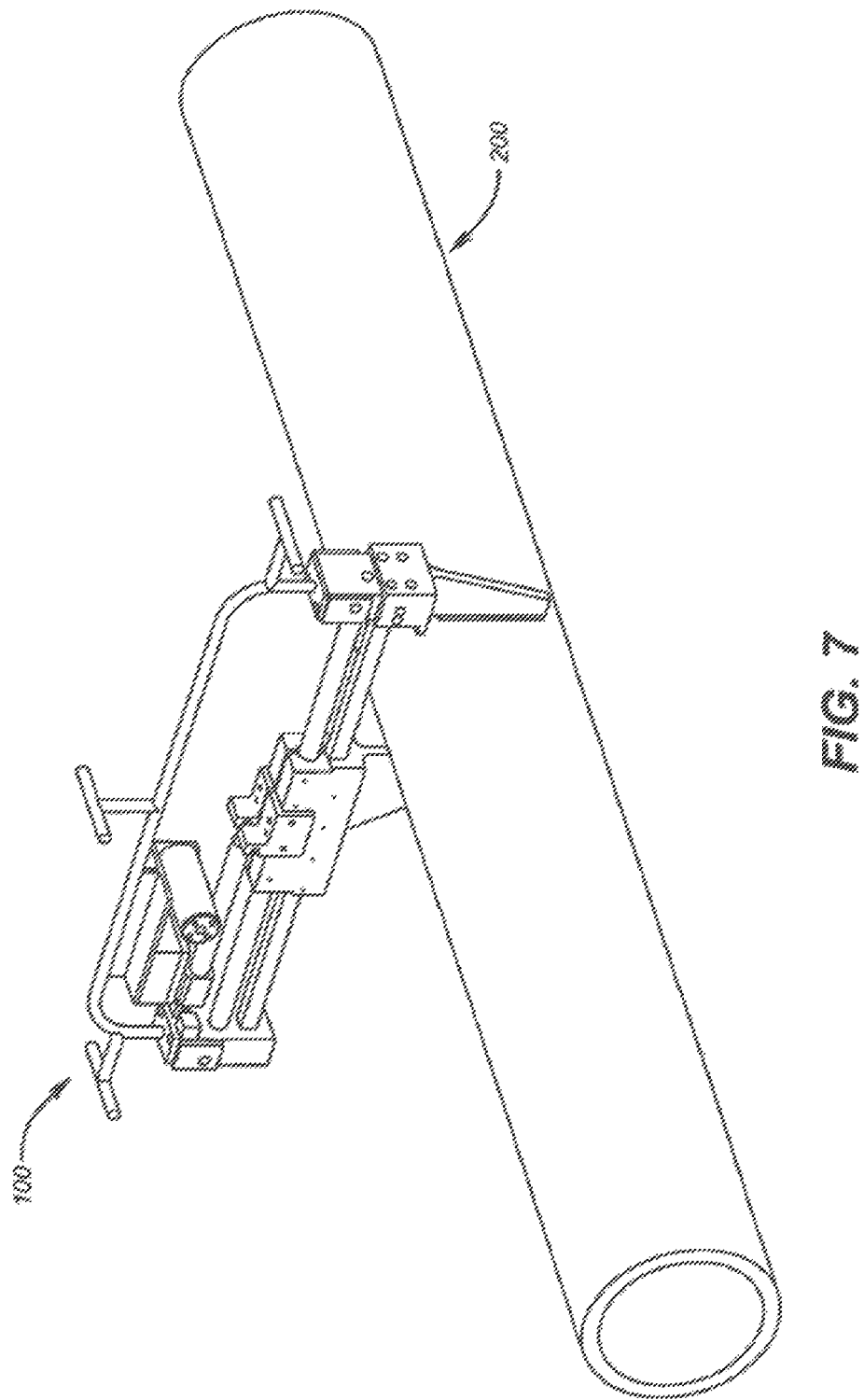

CONTROLLABLE CALIPER

RELATION TO PRIOR APPLICATIONS

This application is a continuation of U.S. patent application Ser. No. 12/243,536 filed Oct. 1, 2008, now issued as U.S. Pat. No. 8,744,801, and claims priority in part through U.S. Provisional Application 60/977,825 filed Oct. 5, 2007 and U.S. Provisional Application 61/032,552 filed Feb. 29, 2008.

FIELD OF THE INVENTION

The controllable caliper is adapted to measure an object's physical dimension. In a preferred embodiment, the digital caliper is adapted for use subsea to measure objects having a physical dimension ranging between around 0 inches to around 16 inches. In a further embodiment, the controllable caliper is a digital caliper.

BACKGROUND OF THE INVENTION

There is a need to obtain and provide measurements of subsea objects to determine strain of parts or corrosion, but not limited to these circumstances. Traditionally, subsea operators have attempted to take physical, lineal measurements of physical features subsea by using laser line scans, photogrammetry or simple, non-adjustable, "go/no-go" gauges. Often, they have not had the accuracy necessary to measure quantities such as strain due to load (stress) or thickness change due to corrosion. These methods also were difficult to use, had to be adjusted on the surface, or required "post-processing" of the information to yield a measurement. What has been needed for some time is a way to take an accurate linear measurement subsea, in realtime, using a tool that is designed for integration with an ROV control system.

BRIEF DESCRIPTION OF THE DRAWINGS

FIGS. 4-7 illustrate exemplary embodiments of the claimed tool in an open position and gauging various objects.

DETAILED DESCRIPTION OF PREFERRED EMBODIMENTS

Figure 1:
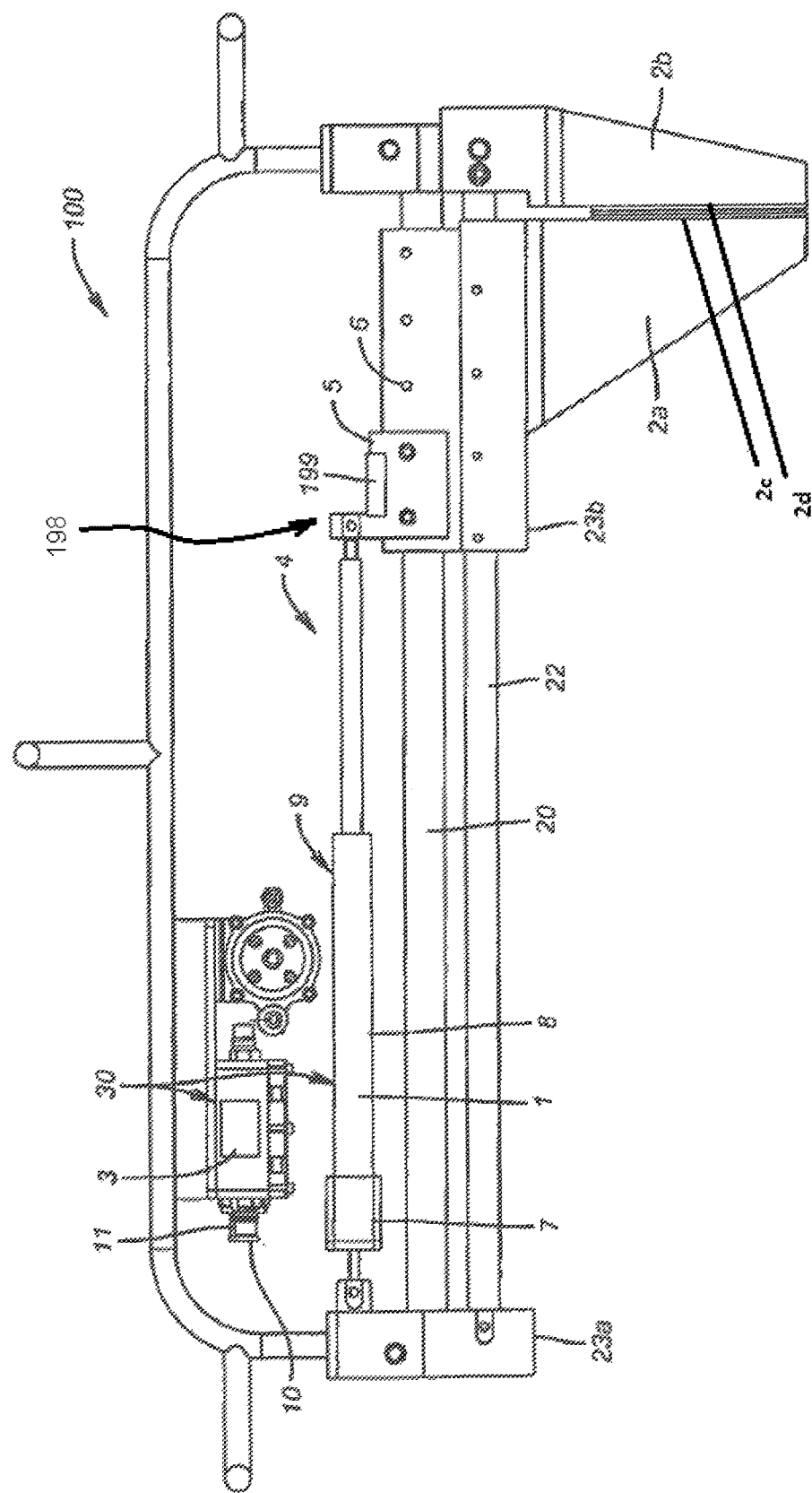
FIG. 1 is a planar side view of an exemplary embodiment.

Referring now to FIG. 1, in an embodiment, tool 100 provides for measuring a physical dimension of an object such as a subsea object. Tool 100 comprises first rail 22; jaws 2a and 2b disposed about first rail 22, at least one jaw 2a,2b being adjustable in a predetermined plane; positioner 30 operatively connected to an adjustable jaw 2a; measurement sensor 9 operatively in communication with positioner 30; pressure balancing compensator 20 connected to positioner 30; data link connector 10; and power source link connector 11.

Rail 22 is typically machined from a corrosion-resistant material, e.g. stainless steel, to afford a smooth sliding/running fit (no play) with jaws 2a,2b. In a preferred embodiment, one end of rail 22 terminates at block 23a and an opposing end terminates at block 23b.

At least one of first or second jaws 2a,2b is adjustable in a predetermined plane with respect to the other of the jaws 2a,2b such as by being movably mounted along rail 22. In a preferred embodiment, a predetermined one of the jaws e.g. jaw 2b, is fixedly attached to a structure such as block 23b and the other jaw, e.g. opposing jaw 2a, is slidably mounted to rail 22. In certain embodiments, fixedly attached jaw 2b is further adapted to allow removal and replacement of one or more attachments 5.

Jaws 2a,2b are typically machined from aluminum and can be fitted with wear resistant inserts 2c, 2d, e.g. inserts made from stainless steel or carbide. Jaws 2a,2b are also typically shaped to fit the intended application. For example, if the diameter of a hole is to be measured, jaws 2a,2b can be machined so that the measuring surfaces face outward. If a chain link or a plate thickness were to be measured, jaws 2a,2b would face inward. Combinations of shapes are also contemplated.

Positioner 30 is typically adapted to effect virtually stepless movement of adjustable jaw 2a. However, in alternative embodiments, positioner 30 may effect discrete step movement of adjustable jaw 2a. In a preferred embodiment, positioner 30 comprises actuator 1, motor controller 51 (FIG. 2), position monitor 3, motor 7, lead screw 8, and measurement sensor 9. In a currently preferred embodiment, position monitor 3 and motor controller 51 are in located the same housing.

Actuator 1 is typically operatively connected to adjustable jaw 2a and motor controller 51 is operatively connected to the actuator 1. In certain embodiments, actuator 1 has an operative stroke length of around 8 inches with an actuator force of around 100 lbs. maximum. In certain embodiments, actuator 1 is an electronic linear actuator with position feedback. In these embodiments, electronic linear actuator 1 further comprises stepper motor 7 and measurement sensor 33.

In a currently preferred embodiment, positioner 30 comprises lead screw 8 operatively in communication with motor 7. Lead screw 8 may be actuated by motor 7, which can be a stepper or servo motor operating through a gearbox. Vendors for such motors include Pacific Scientific, Baldor, Pittman, and Danaher. Vendors for such gearboxes include Bayside and Harmonic Drive Technologies.

In typical embodiments, position monitor 3 comprises a position control module, i.e. a microprocessor or its equivalent and software or its equivalent, operative to allow position monitor 3 to effect controlling the position of jaw 2a along rail 22.

Measurement sensor 9 may be contained at least partially within the same housing as lead screw 8. In preferred embodiments, measurement sensor 9 is a linear potentiometer operatively in communication with motor 7, lead screw 8, or a combination thereof. In a further preferred embodiment, measurement sensor 9 is a linear, absolute measurement device such as a Linear Variable Differential Transformer or a Linear Potentiometer. Vendors of such measurement sensors 9 include Lucas-Schaevitz for LVDTs and Bourns manufactures Linear potentiometers.

Figure 2:
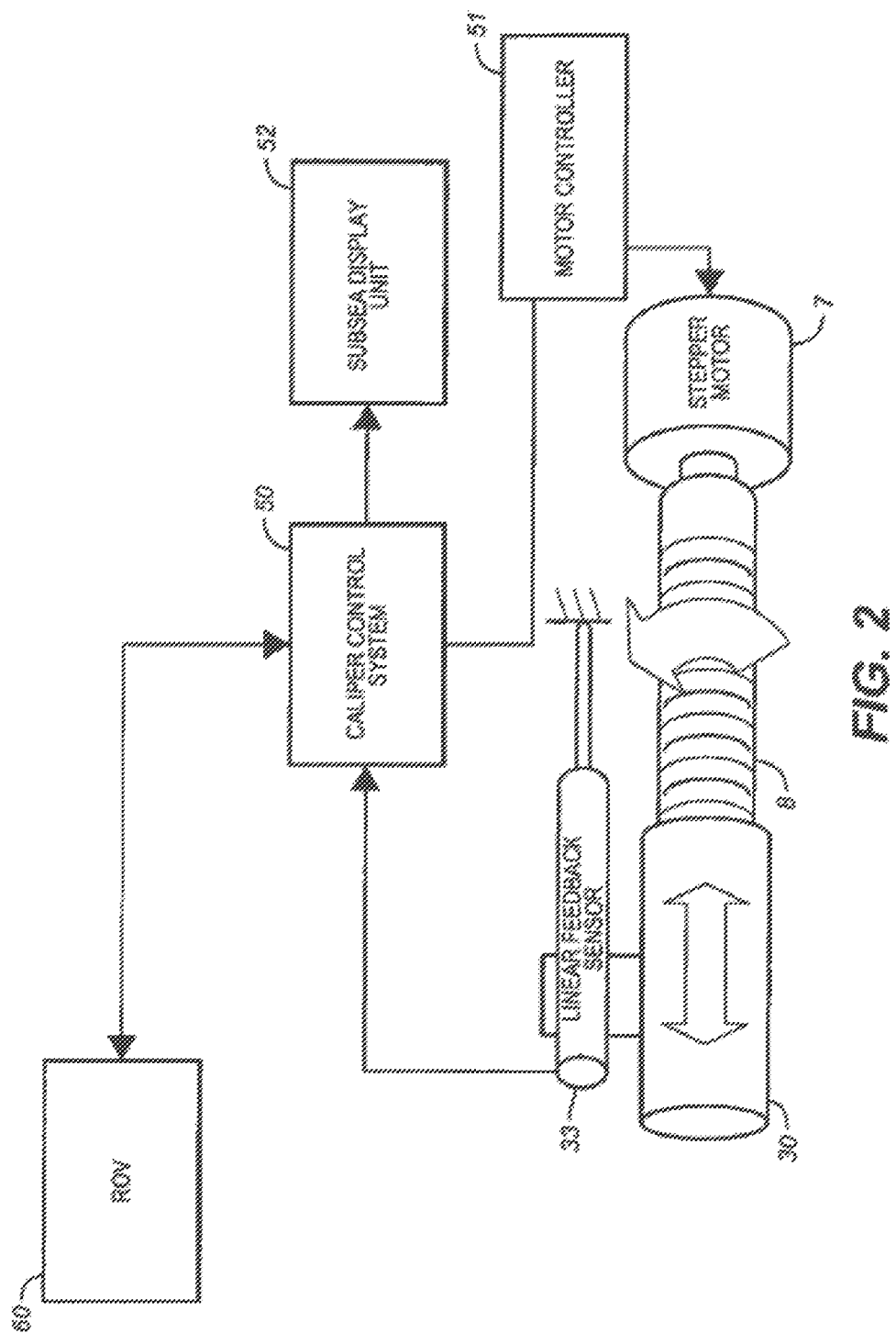
FIG. 2 is a block diagram of an exemplary portion of an exemplary embodiment illustrating a portion of the control system.

Measurement sensor 9 may also comprise feedback sensor 33 (FIG. 2). Measurement sensor 9 is adapted to measure a predetermined physical dimension of an object disposed in-between the jaws 2a,2b.

For subsea operations, data link connector 10 is typically a remotely operated vehicle compatible (ROV) data link connector. Data link connector 10 allows data communication between positioner 30 and measurement sensor 9, e.g. feedback sensor 33 (FIG. 2). Data link connector 10 allows further data communication between computer 50 (FIG. 2), positioner 30, and measurement sensor 9. Data are typically communicated using a standard protocol such as RS233 at supportable data rates. In a preferred embodiment, data are transmitted at 19200 baud in an 8-bit no parity format with 1 stop bit, although other data rates and protocols are supportable.

Power source link connector 11 may be present to accept power from a source such as ROV 60 (FIG. 2). In a preferred embodiment, power source link connector 11 is coterminous with data link connector 10. For subsea operations, power source link connector 11 is typically an ROV 60 compatible power source link connector.

Referring back to FIG. 1, in a further embodiment, tool 100 comprises first rail 22; first jaw 2a and second jaw 2b disposed about the first rail 22, at least one of the first or second jaws 2a,2b being adjustable in a predetermined plane with respect to the other of the jaws 2a,2b along the first rail 22; an electronic positioner 30 operatively connected to at least one of the first jaw 2a and the second jaw 2b; positioning sensor 9 operatively in communication with the electronic positioner 30; measurement sensor 33 operatively in communication with the electronic positioner 30; pressure balancing compensator 4; data link connector 10 to ROV 60 (FIG. 2); and power source link connector 11 to ROV 60.

In contemplated embodiments, actuator attachment 5 may be attached to at least one of the jaws 2a,2b at a predetermined actuator attachment point 6. Typically, actuator attachment 5 is attached to adjustable jaw 2a and comprises strainable member 199, where strainable member 199 is capable of handling mechanical strains of a predetermined magnitude. For example, a metal foil or fiber optic strain gauge 198 can be affixed to actuator 1 so as to indicate the force being applied by the jaws to the object being measured so as to give a positive indication that the jaws are fully contacting the work surface. Similarly, an indication of adequate jaw loading could be afforded by using a small switch to monitor strain of the linear actuator on a mount which incorporates a spring loaded, limited travel slide.

For subsea use, tool 100 is typically constructed of materials sufficient to support a depth rating of around 10000 feet and handle objects ranging from around 0 inches to around 16 inches with a preferred range of around 0 inches to around 13 inches.

Referring additionally to FIG. 2, control software is resident in computer 50 and is adapted to effect a change in positioner 30 based on data from the measurement sensor 33. In a preferred embodiment, control software comprises a position control software module adapted to create data representative of a precise indication of displacement of the adjustable jaw 2a, e.g. from data obtained via data link connector 10, as well provide control signaling to adjust displacement of adjustable jaw 2a. Control software may further comprise a feedback display software module adapted to create feedback information for display such as to computer display 52.

Figure 3:
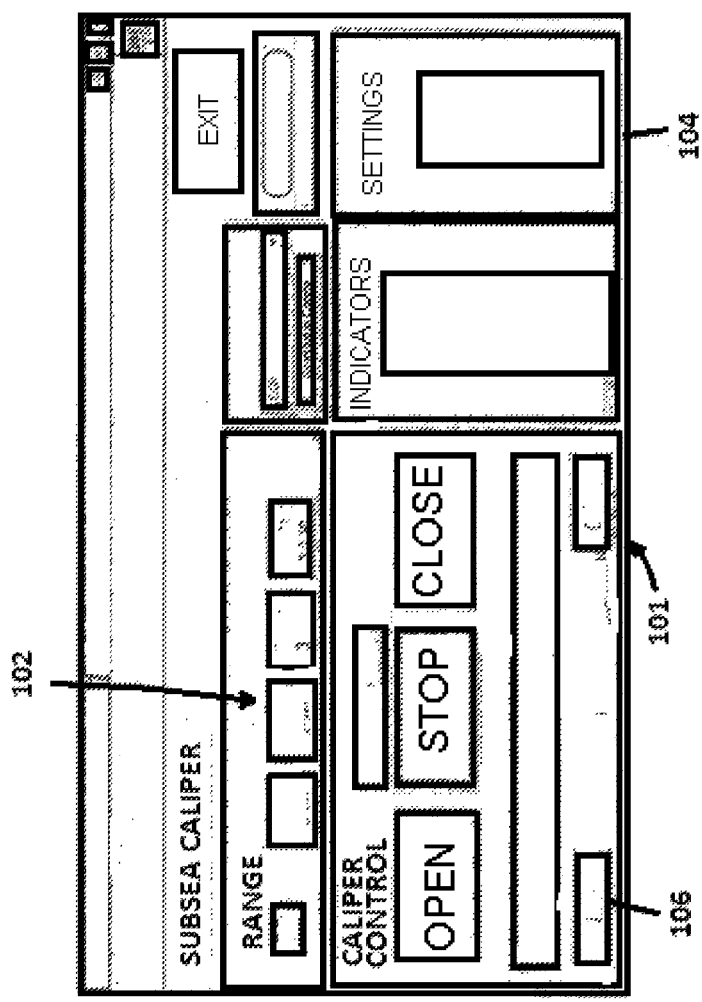
FIG. 3 is an exemplar of a computer graphic interface to a control system.
Figure 4:
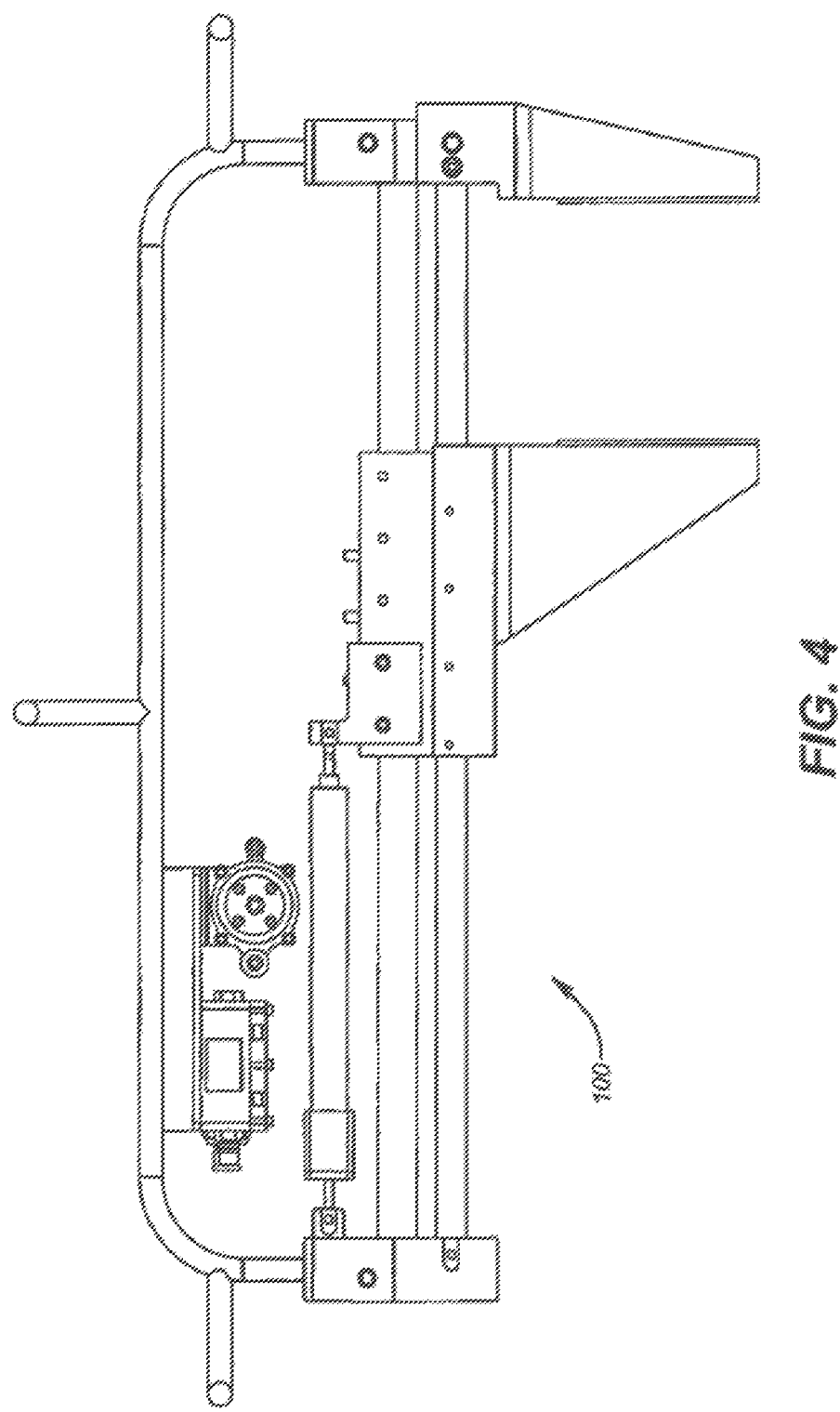
Figure 5:
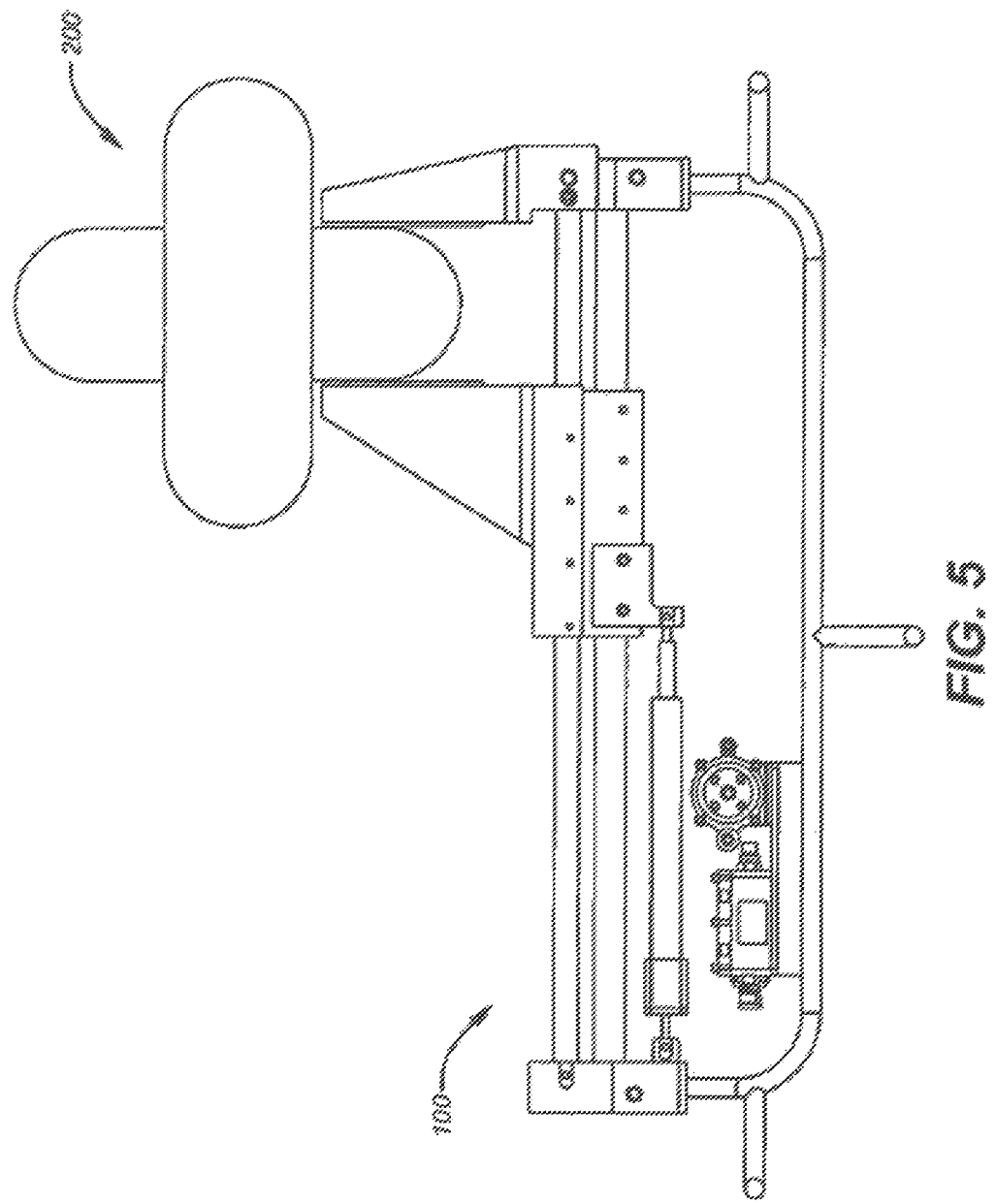

Referring now to FIG. 3, an exemplary computer display controlled by the control software, range scale buttons 102 may be selected in agreement with a mechanical tool configuration of tool 100. For example, where the actuator range is 8 inches, the control software may utilize the actuator range value in combination with the actual, real-time actuator reading to produce a correct measurement of object larger than 8 inches. In experimental operations, best results were obtained with a speed value set to 0.2 inches/second.

Force may be user selectable, e.g. in steps of 1%. As shown in the exemplary embodiment in FIG. 3 at 104, a maximum force may be chosen, e.g. one that equates to 100 lbs.

Tool 100 may be calibrated by using objects of known dimensions, pre- and/or post-dive. Zero button 106 can be used to perform relative measurements, such as when jaws 2a,2b (FIG. 1) are set at a known reference distance.

Water detect alarms may have an indicator to indicate dry (normal) or wet conditions. Water detect circuits are typically built into the electronics which drive motor 7 and read the LYDT or Linear Potentiometer. For example, when there is detectable water level, in a preferred embodiment graphical user interface elements (buttons, light emitting diodes, screen display elements, or the like, or combinations therefore) illuminate to indicate and alarm condition.

In the operation of exemplary embodiments, as shown in FIG. 2 and exemplified in FIGS. 4-7, position control module, e.g. 50, sends a signal to actuator 1 (FIG. 1) which, in turn, controls positioner 30 (FIG. 1) which, as illustrated, may comprise lead screw 8 (FIG. 2). In this embodiment, actuator 1, which may be a linear actuator, extends or retracts a position of jaw 2a (FIG. 1) to a required location via actuator 1, e.g. motor 7, e.g. a stepper motor, translates the request into linear motion through lead screw 8. When actuator 1 stops, the location of jaw 2a along rail 22 (FIG. 1) is relayed through position control module 33 and displayed at the surface through computer 50 with the control software.

Measurement of a physical dimension of a device, e.g. one located subsea, may be obtained by maneuvering tool 100 (FIGS. 4-7) to a position proximate object 200, tool 100 comprising a set of jaws 2a,2b. Jaws 2a, 2b are either already in an opened position or are opened upon locating tool 100 proximate object 200.

A signal is sent from position control module 50 (FIG. 2) to actuator 1 (FIG. 1) operatively in communication with position controller 3 (FIG. 1) where position controller 3 is operatively in communication with at least one of the set of jaws 2a, 2b.

A state of actuator 1 (FIG. 1) is changed, e.g. extended or contracted, to a desired state using stepper motor 7 (FIG. 2) translated to linear motion through lead screw 8 (FIG. 2). This changing of the state of actuator 1 preferably occurs in a preselected discrete step. In certain embodiments, the changing of the state of actuator 1 continues occurs until a feedback measurement reaches a predetermined value.

Actuator 1 is stopped and the location of jaws 2a,2b, relayed through position control module 3.

Additionally, a change in a predetermined physical characteristic may be measured during the changing of the state, e.g. compression or tension. Tool 100 typically has a plurality of measurement ranges, with a typical spread of jaws 2a,2b ranging from around 0 inches to around 13.3 inches.

The location may then be observed, e.g. displayed, at the surface such as by using control software within computer 50 (FIG. 2).

Tool 100 calibration is typically obtained manually, either pre-, post-, or both pre- and post-use such as by comparison to a known object size.

Position monitor 3 may further provide a pre-selected amount of force to exert on jaws 2a,2b or attachment 6 from 0-100% of available force.

The foregoing disclosure and description of the inventions are illustrative and explanatory. Various changes in the size, shape, and materials, as well as in the details of the illustrative construction and/or an illustrative method may be made without departing from the spirit of the invention.

We claim:

1. A tool for measuring a physical dimension of an object, comprising:
   a) a first rail comprising a corrosion-resistant material suitable for use subsea;
   b) a first jaw and a second jaw disposed about the first rail, at least one of the first or second jaws being adjustable in a predetermined plane with respect to the other of the jaws along the first rail, each jaw comprising a corrosion-resistant material suitable for use subsea;
   c) an electrically actuated positioner operatively connected to the adjustable jaw, the electrically actuated positioner comprising an electrically actuated actuator operatively connected to the adjustable jaw and adapted to effect movement of the adjustable jaw;
   d) a measurement sensor operatively in communication with the electrically actuated positioner, the measurement sensor adapted to measure a predetermined physical dimension of the object disposed in-between the jaws;
   e) a pressure balancing compensator operatively coupled to the electrically actuated positioner;
   f) a data link connector adapted to interface to a remotely operated vehicle, the data link connector operatively in communication with the electrically actuated positioner and the measurement sensor; and
   g) a power source link connector adapted to interface to a remotely operated vehicle.

2. The tool of claim 1, wherein the electrically actuated positioner is adapted to effect stepless movement of the adjustable jaw.

3. The tool of claim 1, wherein the electrically actuated positioner further comprises position monitoring electronics operatively connected to the electrically actuated actuator and adapted to monitor a position of the electrically actuated actuator with respect to movement of the adjustable jaw along the first rail.

4. The tool of claim 3, wherein the position monitoring electronics comprises a position control module operatively in communication with the electrically actuated actuator.

5. The tool of claim 4, wherein the electrically actuated actuator comprises an electronic linear actuator, the electronic linear actuator comprising a position feedback module operatively in communication with the position control module.

6. The tool of claim 5, wherein the electronic linear actuator further comprises:
   a) a stepper motor;
   b) a lead screw operatively in communication with the stepper motor; and
   c) a linear potentiometer operatively in communication with the stepper motor.

7. The tool of claim 1, wherein the first jaw and the second jaw comprise a wear resistant insert adapted for use subsea.

8. The tool of claim 1, wherein at least one the first jaw and the second jaw comprises a shape adapted for a specifically shaped object to be measured.

9. The tool of claim 1, further comprising a first actuator attachment attached to at least one of the jaws at a predetermined actuator attachment point.

10. The tool of claim 9, wherein the first actuator attachment comprises:
    a) a strainable member; and
    b) a strain gauge mounted on the strainable member.

11. The tool of claim 9, wherein:
    a) a predetermined one of the first jaw and a second jaw is fixedly attached to a structure; and
    b) the fixedly attached jaw is adapted to allow removal and replacement of second actuator attachment.

12. A measurement system, comprising:
    a) a tool for measuring a physical dimension of an object, comprising:
       i) a first rail comprising a corrosion-resistant material suitable for use subsea;
       ii) a first jaw and a second jaw disposed about the first rail, at least one of the first or second jaws being adjustable in a predetermined plane with respect to the other of the jaws along the first rail, the first jaw and second jaw each comprising a corrosion-resistant material suitable for use subsea;
       iii) a non-hydraulically actuated linear positioner operatively connected to the adjustable jaw, the non-hydraulically actuated linear positioner comprising a non-hydraulically actuator operatively connected to the adjustable jaw and adapted to effect movement of the adjustable jaw;
       iv) a measurement sensor operatively in communication with the non-hydraulically actuated positioner, the measurement sensor adapted to measure a predetermined physical dimension of the object when the object is disposed in-between the jaws;
       v) a pressure balancing compensator operatively coupled to the non-hydraulically actuated positioner;
       vi) a data link connector adapted to interface to a remotely operated vehicle, the data link connector operatively in communication with the non-hydraulically actuated positioner and the measurement sensor;
       vii) a power source link connector adapted to interface to a remotely operated vehicle;
    b) a computer operatively in communication with the non-hydraulically actuated positioner and the measurement sensor via the data link connector, the computer comprising a humanly perceptible display; and
    c) control software resident in the computer, the control software adapted to effect a change in the non-hydraulically actuated positioner based at least in part on data from the measurement sensor.

13. The measurement system for measuring a physical dimension of an object subsea of claim 12, wherein the control software comprises a position control software module adapted to create data representative of a precise indication of displacement of the adjustable jaw and adjust displacement of the adjustable jaw.

14. The measurement system for measuring a physical dimension of an object subsea of claim 13, wherein the control software further comprises a feedback display software module adapted to obtain the measured predetermined physical dimension of the object disposed in-between the jaws from the measurement sensor and create feedback information for output to the display.

15. A method of measuring a physical characteristic of an object subsea using a calibrated tool comprising a first rail, the first rail comprising a corrosion-resistant material suitable for use subsea; a first jaw and a second jaw disposed about the first rail, at least one of the first or second jaws being adjustable in a predetermined plane with respect to the other jaw along the first rail, each of the first jaw and the second jaw comprising a corrosion-resistant material suitable for use subsea; an electrically non-hydraulically actuated linear positioner operatively connected to the adjustable jaw, the non-hydraulically actuated linear positioner comprising an electrically actuated non-hydraulic actuator operatively connected to the adjustable jaw and adapted to effect movement of the adjustable jaw; a measurement sensor operatively in communication with the electrically actuated linear positioner, the measurement sensor adapted to measure a predetermined physical dimension of an object disposed in-between the jaws; a pressure balancing compensator operatively coupled to the electrically actuated linear positioner; a data link connector adapted to interface to a remotely operated vehicle, the data link connector operatively in communication with the electrically actuated linear positioner and the measurement sensor; and a power source link connector adapted to interface to a remotely operated vehicle; the method comprising:

a) maneuvering the calibrated tool to a position proximate the subsea object;

b) positioning the subsea object in-between the first jaw and the second jaw;

c) sending a positioning signal from the position control module to the electrically actuated actuator to have the electrically actuated actuator effect a change in a position of the first jaw with respect to the second jaw;

d) obtaining a feedback measurement of a predetermined characteristic related to a physical attribute of the subsea object;

e) continuing to position the subsea object in-between the first jaw and the second jaw until the feedback measurement reaches a predetermined value; and f) stopping the electrically actuated actuator's effecting the change when the feedback measurement reaches the predetermined value.

16. The method of claim 15 of measuring a physical characteristic of an object subsea, wherein the feedback measurement comprises a measurement of compression of the object disposed in-between the first jaw and the second jaw.

17. The method of claim 15 of measuring a physical characteristic of an object subsea, wherein the feedback measurement comprises a measurement of tension within the object disposed in-between the first jaw and the second jaw.

18. The method of claim 15 of measuring a physical characteristic of an object subsea, wherein the tool is manually calibrated.

19. The method of claim 15 of measuring a physical characteristic of an object subsea, wherein the first jaw and the second jaw are shaped to fit a shape of the subsea object.

20. The method of claim 15 of measuring a physical characteristic of an object subsea, further comprising calibrating the tool using an object of known dimensions, either before deploying the tool subsea or after deploying the tool subsea.

* * * * *